Aug. 1, 1939.  W. F. KIESEL, JR  2,168,293
RAILWAY CAR TRUCK
Filed May 25, 1936  4 Sheets-Sheet 1
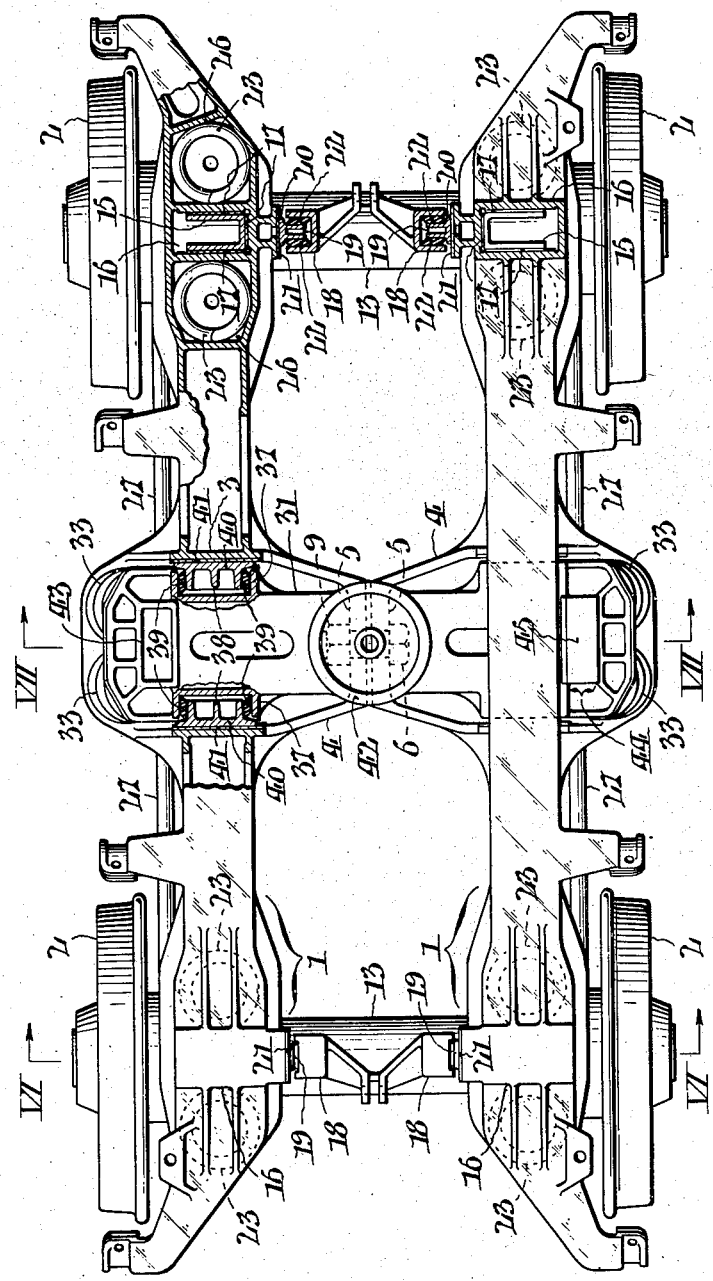
FIG. I.
WITNESSES:
John C. Bergner
John A. Weidler
INVENTOR:
William F. Kiesel, Jr.,
BY Frally Paul
ATTORNEYS.

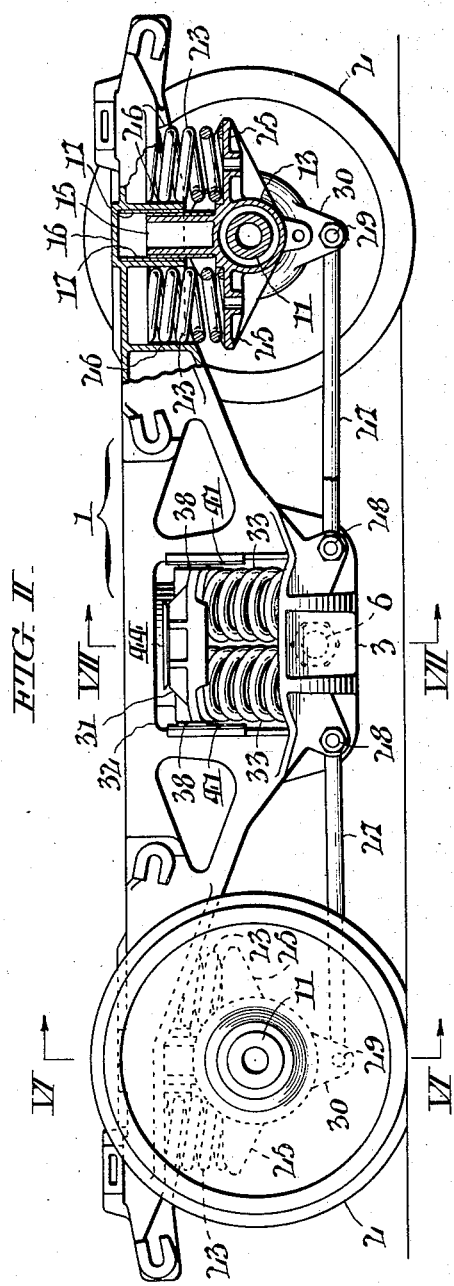

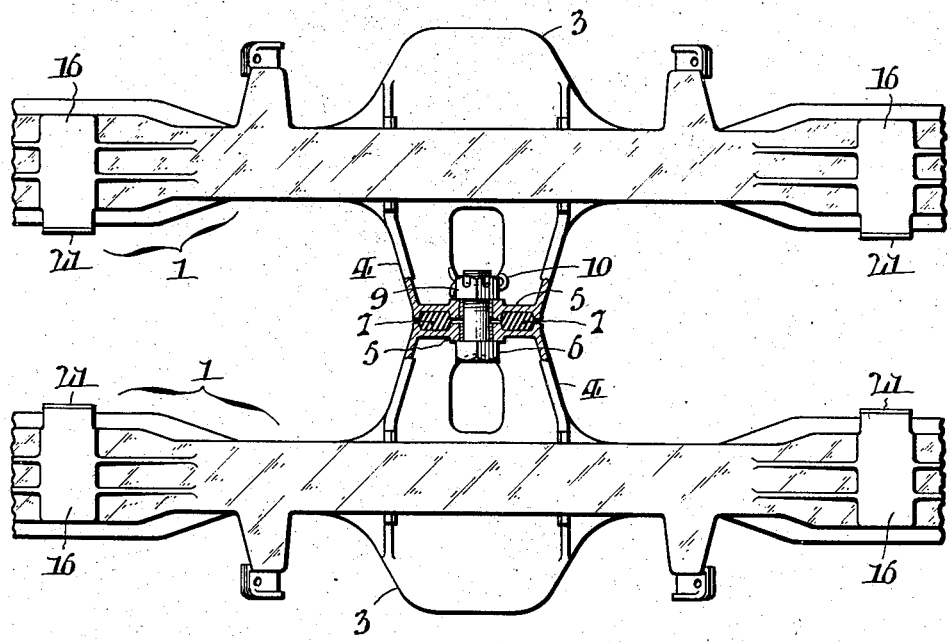
FIG. IV
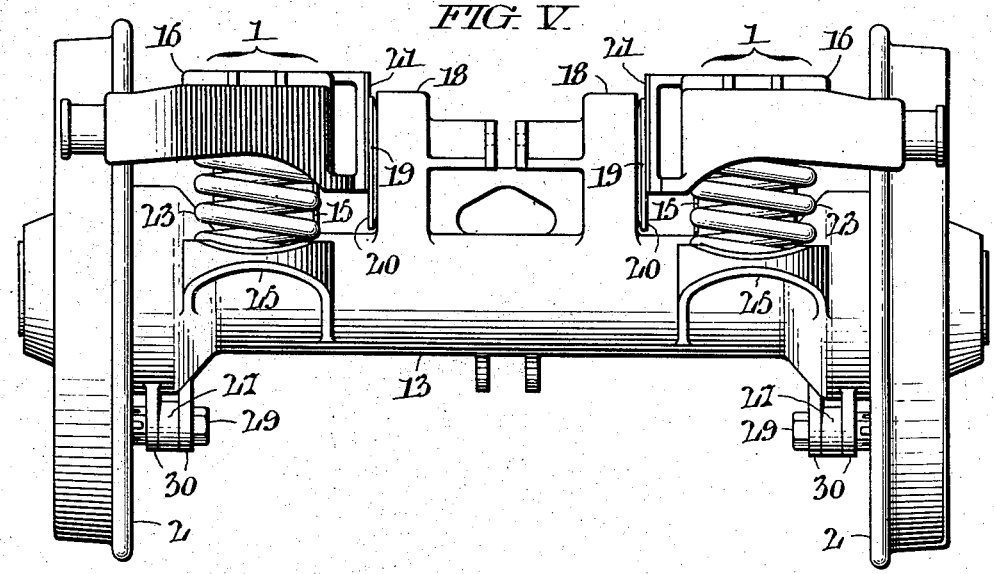
FIG. V

Aug. 1, 1939.  W. F. KIESEL, JR  2,168,293
RAILWAY CAR TRUCK
Filed May 25, 1936  4 Sheets-Sheet 4
FIG. VI
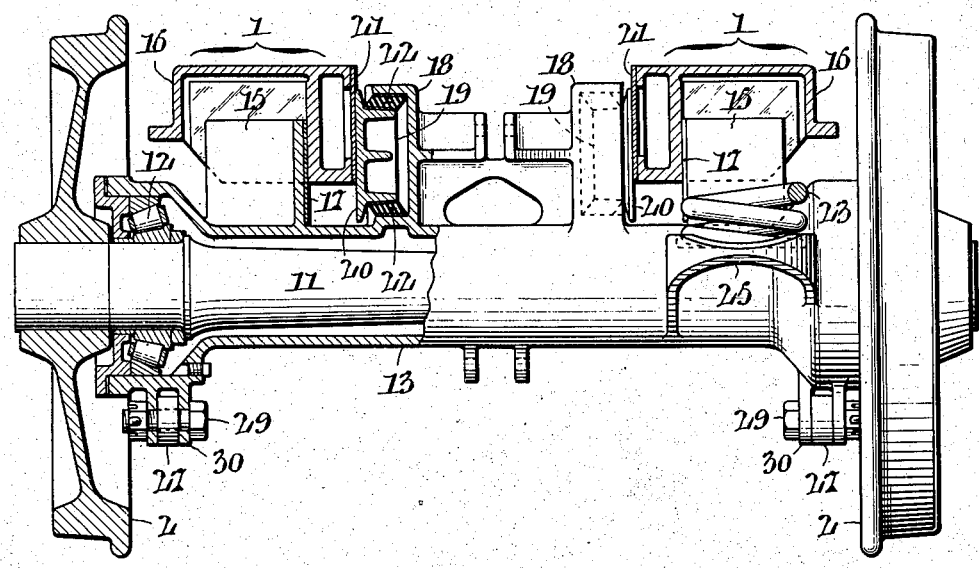
FIG. VII
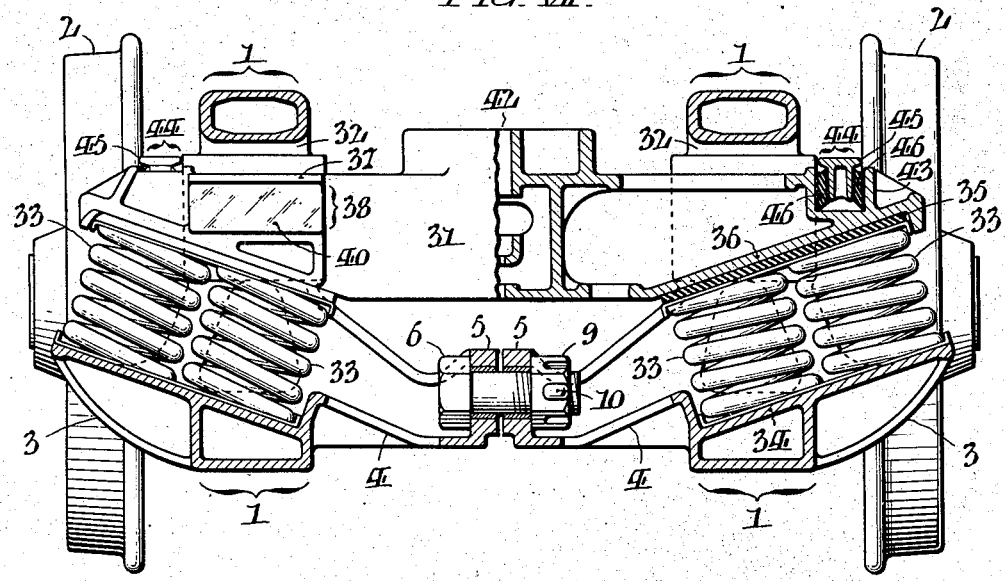
WITNESSES:
John E. Bergner
John A. Weidler
INVENTOR:
William F. Kiesel, Jr.,
BY Fraley & Paul
ATTORNEYS.

Patented Aug. 1, 1939

2,168,293

UNITED STATES PATENT OFFICE 2,168,293

RAILWAY CAR TRUCK

William F. Kiesel, Jr., Hollidaysburg, Pa., assignor to The Pennsylvania Railroad Company, Philadelphia, Pa., a corporation of Pennsylvania Application May 25, 1936, Serial No. 81,658

25 Claims. (Cl. 105—182)

This invention relates to trucks for railway cars and the like; and it has for its chief aims to simplify the construction of such trucks, to prevent communication of shocks and vibrations from the trucks to the car bodies, to secure quieter operation, and to generally improve the riding qualities of car trucks.

The above desiderata I realize in practice as hereinafter more fully explained through provision of a truck wherein the frame comprises longitudinal side components which are capable of relative up and down movement about a central transverse pivotal connection and supported at opposite ends upon upright helical springs directly over the journals for the wheel axles; wherein the journals are in the form of roller bearings set into axle housings or quills with upstanding projections slidingly engaged in guide boxes on the frame components; wherein a crosswise bolster, with a central pivot bearing for the truck, overlies the transverse pivot connecting the frame components and is supported at opposite ends upon helical bearing springs which rest upon the bottoms of central yoke openings in said frame components and which are complementarily inclined relative to the longitudinal median of the truck to cradle the load for both vertical and lateral forces; and wherein snubbing devices serve to absorb the vibration of the moving parts of the truck and at the same time compensate for the looseness or working play between said parts as well as between the car body and the side bearings therefor on the bolster.

Other objects and attendant advantages will appear from the following detailed description of the attached drawings, whereof Fig. I is a plan view of a railway car truck conveniently embodying the present invention with a portion of the frame broken away and in section for better illustration of important structural features.

Fig. II is a view of the truck partly in side elevation and partly in longitudinaly section.

Fig. III is a view in side elevation showing how the two longitudinal components of the truck frame pivot relative to each other.

Fig. IV is a fragmentary plan of the truck frame with the central portion thereof in section through the pivot connecting the side components.

Fig. V shows the elevation of one end of the truck.

Fig. VI is a broken-out transverse sectional view of the truck taken as indicated by the arrows VI—VI in Figs I and II; and Fig. VII is a central cross-sectional view of the truck taken as indicated by the arrows VII—VII in Figs. I and II.

As herein delineated, the frame of my improved car truck comprises two counterpart longitudinal side components 1 which are disposed inward of the wheels 2 whereof there are four in this instance. From Figs. I and III it will be observed that the frame components 1 are substantially straight at the top and formed with pendant yokes 3, medially of their lengths. Extending inwardly from the lower portions of the yokes 3 are integrally-formed opposing projections 4, see Figs. I and VII, which terminate in axially-aligned bosses 5 with machined faces. Connecting the two frame components 1 is a bolt 6 which passes through bushed apertures in the bosses 5 and thus constitutes a transverse pivot axis about which said frame components can rock up and down relatively as shown in Fig. III for a purpose later on explained. Interposed between the bosses 5 at opposite sides of the pivot bolt 6 are blocks 7 of rubber or the like which are compressed as the nut 9 on said bolt is drawn up. After assembly of the frame components 1, the nut 9 is made secure against loosening by a safety cotter pin 10.

The two wheel axles 11 of the truck are journaled in roller bearings 12 set into the opposite ends of the tubular axle housings or quills 13. As shown in Figs. I and VI the quills 13 are formed adjacent their ends with upstanding projections 15 which slidingly engage in guide boxes 16 on the frame components 1 directly above the axles 11. The innermost and lateral faces of the projections 15 on the quills 13, see Fig. I, bear, with interposition of wear plates 17, against the contiguous inner faces of the boxes 16. Somewhat inward of the projections 15 the quills 13 are formed with outwardly-open-symmetrically-disposed supplemental projections 18, the hollows of which are occupied by snubbing devices 19, see Figs. I and VI. As shown. each of these snubbing devices 19 includes a shoe 20 which bears against a wear plate 21 on the contiguous face of the corresponding box 16 on the frame component 1 and which is yieldingly urged outward under the influence of blocks 22 of rubber or the like inserted under pressure and buttressed by the supplemental projection 18.

The truck frame is supported by upright helical springs 23 directly over the axle journals 12, there being a pair of such springs for each end of the two frame components 1. As shown in Figs. I and II, the springs 23 of each such pair are symmetrically disposed at opposite sides of one of the upward projections 15 of the axle housings 13 longitudinally of the truck with their lower ends resting upon seats 25 on said housings and with their upper ends engaging within open-bottomed pockets 26 on the frame components 1.

Horizontal link rods 27 at opposite sides of the truck, each with a pivotal connection 28 at one end with the pendant center yoke 3 of the corresponding frame component 1 and a pivotal connection 29 at the other end with a pendant lug 30 on one of the axle housings or quills 13, insure parallelism of the axles 11 and at the same time prevent binding of the upward projections 15 of said housings or quills within the guide boxes 16 of said frame components.

The truck also includes a bolster 31 which extends crosswise of the two frame components 1 directly above the transverse connecting pivot bolt 6 with its ends projecting into the vertical openings 32 of the yokes 3, see Fig. I. The bolster 31 is supported by helical springs 33 of which there are four at each side of the truck, the two spring groups being complementarily inclined with respect to the longitudinal median of the truck, see Fig. VII. As shown, the lower ends of the springs 33 of the two groups rest respectively on inwardly sloping recessed seats 34 at the bottoms of the yoke openings 32, while their upper ends engage, with interposition of isolating pads 35, against correspondingly-sloped recessed seats 36 on the bolster 31. At opposite ends, the bolster 31 is formed with outwardly-open hollow side projections 37 within the confines of the yoke openings 32. Occupying the hollows of the projections 37 are snubbing devices 38 which are generally like the snubbing devices 19 previously described, and whereof the compressed rubber blocks 39 serve to maintain the shoes 40 in yielding sliding contact with wear plate facings 41 at opposite sides of the yoke openings 32. At its center, the bolster 31 is formed with a bearing 42 for pivotal connection of the truck to the bolster (not illustrated) on the car body, and at the top near its ends with pockets 43 containing snubbing devices 44, which are also like the snubbing devices 19, see Fig. VII, and whereof the shoes 45 are yieldingly urged upward by the rubber blocks and serve as outer bearings for the car body.

In the operation of the truck, the shocks received by any one of the wheels 2 in passing over joints or irregularities in the rails are absorbed compensatively and equally by the several relatively flexible vertical springs 23 as a consequence of the equalizing action of the two frame components in their pivotal movement about the transverse connecting pivot bolt 6 incident to which the wheel axles 11 will be maintained in true parallelism through guidance of the upstanding projections 15 on the axle housings or quills 13 by the boxes 16 on said frame components, and through concurrent action of the links 27. At the same time, any vertical movement of the truck frame as a whole will obviously be absorbed by the bolster supporting springs 33 and hence not affect the car body, said springs also serving to counteract both vertical and lateral forces influencing the car body.

In addition to the improved riding qualities resulting from the described construction, my improved truck is quiet in its operation since looseness between the moving parts is absorbed and communication of vibration of such parts, including the springs 23 and 33 from one to the other or to the car body prevented by the rubber blocks 7 at the pivot 6 for the frame components 1 and by the several snubbing devices 19, 38 and 44. In this connection it is important to note that the snubbing devices at 19 also assist in maintaining the parallel alignment of the frame components 1; while the devices at 38 function to prevent "dancing" of the car, and the devices at 44 preclude "hunting" or "nosing" of the truck as well as to prevent noise by keeping the body and truck side bearings continually in contact.

The truck herein shown by way of illustration is of course to be regarded as typical of other forms in which this invention may be embodied within the scope of the appended claims.

Having thus described my invention, I claim:

1. A railway car truck comprising a frame with side components interpivoted for capacity to move up and down relatively; axles with wheels at opposite ends; tubular journal housings enclosing the axles between the wheels and having upward projections engaged in guide boxes on the side components of the frame; and cushioning means interposed between the axle housings and the frame components.

2. A railway car truck according to claim 1, wherein the cushioning means comprises upright helical springs with their lower ends resting on the journal housings and their upper ends engaged in pockets on the frame components.

3. A railway car truck comprising a frame with longitudinal side components pivotally connected at the center of the truck for capacity to move up and down relatively; axles with wheels at opposite ends; tubular journal housings enclosing said axles in the intervals between the wheels and engaged, with capacity for independent up and down movement in the side components of the frame; and cushioning means interposed between the ends of the axle journal housings and the ends of the frame components.

4. A railway car truck according to claim 1, including a crosswise bolster with its ends projecting into vertical openings in the frame components and supported by springs resting on the bottoms of said openings; and yielding snubbing devices interposed between the opposite sides of the bolster ends and the contiguous sides of the openings in said components.

5. A railway car truck according to claim 1, including a crosswise bolster with its ends projecting into openings in the frame components and supported by springs resting on the bottoms of said openings; and snubbing devices interposed between the opposite sides of the bolster ends and the contiguous sides of the openings in the frame components, each of said snubbing devices including individual shoes; and blocks of compressed rubber for maintaining the shoes in yielding bearing contact with the corresponding sides of the openings aforesaid.

6. A railway car truck comprising a frame with two longitudinal side components capable of relative up and down movement about a central transverse pivot connecting the ends of inwardly extending opposing central projections of said components; two axles with wheels at opposite ends; tubular journal housings enclosing said axles in the intervals between the wheels and engaged with capacity for independent up and down movement in opposite ends of the side components of the frame; and cushioning means interposed between the axle journals and the frame components.

7. A railway car truck comprising a frame with two longitudinal side components capable of relative up and down movement about a transverse pivot connecting the ends of inwardly-extending opposing central projections of said components; two axles with wheels at opposite ends; tubular journal housings enclosing the axles in the intervals between the wheels and having upstanding projections slidingly engaging guide boxes at opposite ends of the frame components; and springs resting on the journal housings and supporting said frame components.

8. A railway car truck comprising a frame with side components interpivoted for capacity to move up and down relatively; axles with wheels; journal housings for the axles with upward projections engaged in guide boxes on the side components of the frame; cushioning means interposed between the axle housings and the frame components; and a crosswise bolster supported at opposite ends upon springs resting on the frame components and complementarily inclined in respect to the longitudinal median of the truck.

9. A railway car truck comprising a frame with side components interpivoted for capacity to move up and down relatively; axles with wheels; journal housings for the axles with upward projections engaged in guide boxes on the side components of the frame; cushioning means interposed between the axle housings and the frame components; and a crosswise bolster with its ends projecting into vertical yoke openings in the frame components and supported by helical springs resting on the bottoms of said openings, said springs being complementarily inclined in respect to the longitudinal median of the truck.

10. A railway car truck comprising a frame with side components interpivoted for capacity to move up and down relatively; axles with wheels; journal housings for the axles with upward projections engaged in guide boxes on the side components of the frame; cushioning means interposed between the axle housings and the frame components; and yielding snubbing devices for maintaining the bearing surfaces of the guide boxes on the frame components in sliding contact with the upward projections on the axle housings.

11. A railway car truck comprising a frame with side components interpivoted for capacity to move up and down relatively; axles with wheels; journal housings for the axles with upward projections engaged in guide boxes on the side components of the frame; cushioning means interposed between the axle housings and the frame components; supplemental vertical projections on the wheel axle housings spaced somewhat inward from the first mentioned vertical projections; and yielding snubbing devices buttressed by the supplemental projections and serving to press the frame components outward to maintain the bearing surfaces of the guide boxes on said components in sliding engagement with the first mentioned projections.

12. A railway car truck comprising a frame with side components interpivoted for capacity to move up and down relatively; axles with wheels; journal housings for the axles with upward projections engaged in guide boxes on the side components of the frame; and cushioning means interposed between the axle housings and the frame components; supplemental projections on the wheel axle housings spaced somewhat inward from the first mentioned projections; and yielding snubbing devices buttressed by the supplemental projections and serving to press the frame components outward to maintain the bearing surfaces of the guide boxes on said components in sliding engagement with the first mentioned projections, said snubbing devices including shoes and blocks of compressed rubber to urge the shoes toward the inner sides of the frame components.

13. A railway car truck comprising a frame with two longitudinal side components capable of relative up and down movement about a central transverse connecting pivot; two axles with wheels; journals for said axles engaged with capacity for independent up and down movement in opposite ends of the side components of the frame; cushioning means interposed between the axle journals and the frame components; and a resilient member interposed between the side components at the pivotal connection.

14. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housing and supporting said frame components; horizontal links at opposite sides of the truck having pivotal connections at one of their ends with the frame components and at their other ends with the axle housings, for maintaining the axles in parallelism and preventing binding of the upward projections of the said axle housing in the guide boxes.

15. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; supplemental projections on the axle housings inwardly of the upstanding projections aforesaid; and snubbing devices buttressed by said supplemental projections for urging the side components outwardly to yieldingly maintain the bearing surfaces of the guide boxes on the frame components in sliding contact with the corresponding faces of the first mentioned projections.

16. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; a crosswise bolster directly above the transverse pivot connecting the frame components and having a central bearing for pivotal connection of the truck to the car body; and springs resting on the frame components and supporting the bolster at opposite ends.

17. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; a crosswise bolster directly above the transverse pivot connecting the frame components and having a central bearing for pivotal connection of the truck to the car body; and helical springs complementarily inclined in respect to the longitudinal median of the truck, resting on the frame components and supporting the bolster at opposite ends.

18. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; a crosswise bolster directly above the transverse pivot connecting the frame components, said bolster having its ends projecting into central vertical yoke openings in said frame components and providing a central bearing for pivotal connection of the truck to the car body; and springs resting on the bottoms of the said yoke openings and supporting said bolster at opposite ends.

19. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; a crosswise bolster directly above the transverse pivot connecting the frame components with its ends projecting into central vertical yoke openings in said frame components and providing a central bearing for pivotal connection of the truck to the car body; springs resting on the bottoms of the yoke openings and supporting the bolster at opposite ends; and yielding snubbing devices interposed between the sides of the bolster ends and the contiguous sides of said yoke openings.

20. A railway car truck comprising a frame with two longitudinal side components capable of relative up and down movement about a central transverse connecting pivot; two axles with wheels; axle journal housings with upstanding projections slidingly engaging guide boxes at opposite ends of the frame components; springs resting on the journal housings and supporting said frame components; a crosswise bolster directly over the transverse pivot connecting the frame components, said bolster having a central bearing for pivotal connection of the truck to the car body; springs resting on the frame components and supporting the bolster at opposite ends; and yielding snubbing devices at the tops of the bolster constituting the outer bearings for the car body.

21. In a rail truck, axles, bearings on said axles, a pair of equalizer bars, one on each side of the truck and secured to the bearings on that side, means connecting said equalizer bars and preventing relative rotation thereof about longitudinal axes or vertical axes while allowing relative rotation thereof about a transverse axis, and means independent of said connecting means for carrying the weight of a car on said equalizer bars.

22. A rail truck according to claim 21, in which the bearings have capacity for vertical movement relative to the equalizers, and in which yielding means are interposed between the bearings and the equalizers.

23. A rail truck according to claim 21, in which the car-carrying means includes a bolster, and includes springs in compression between the bolster and the equalizer bars.

24. A rail truck according to claim 21, in which the equalizer bars are respectively provided with yoke openings; in which the car-carrying means includes a transverse bolster whereof the ends extend into the yoke openings of the equalizers, and springs interposed between the ends of the bolster and the bottoms of said yoke openings.

25. A rail truck according to claim 21 in which the equalizer bars are respectivly provided with yoke openings; and in which the car carrying means includes a transverse bolster whereof the ends extend into the yoke openings of the equalizers, and springs pitched at opposing angles transversely of the truck and interposed between the ends of the bolster and the bottom of said yoke openings.

WILLIAM F. KIESEL, Jr.